(12) United States Patent
Darolia et al.

(10) Patent No.: US 6,632,480 B2
(45) Date of Patent: Oct. 14, 2003

(54) NICKEL-BASE SUPERALLOY ARTICLE WITH RHENIUM-CONTAINING PROTECTIVE LAYER, AND ITS PREPARATION

(75) Inventors: Ramgopal Darolia, West Chester, OH (US); Joseph D. Rigney, Milford, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/264,451

(22) Filed: Oct. 3, 2002

(65) Prior Publication Data

US 2003/0035892 A1 Feb. 20, 2003

Related U.S. Application Data

(62) Division of application No. 09/562,999, filed on Apr. 24, 2000, now Pat. No. 6,461,746.

(51) Int. Cl.[7] .......................... B05D 1/36; C23C 14/00; C23C 16/00
(52) U.S. Cl. ................. 427/404; 427/419.1; 427/419.2; 427/455; 427/456; 427/576; 427/580; 427/597; 427/250; 204/192.1
(58) Field of Search ............... 427/404, 419.1, 427/419.2, 455, 456, 576, 580, 597, 250; 204/192.1

(56) References Cited

U.S. PATENT DOCUMENTS

| 3,754,902 A | 8/1973 | Boone et al. |
| 4,758,480 A | 7/1988 | Hecht et al. |
| 5,683,825 A | 11/1997 | Bruce et al. |
| 5,939,204 A | * 8/1999 | Czech ................. 428/469 |
| 5,993,980 A | 11/1999 | Schmitz et al. |
| 6,153,313 A | 11/2000 | Rigney et al. |

FOREIGN PATENT DOCUMENTS

GB  2322869 A  9/1998

* cited by examiner

Primary Examiner—Michael Barr
(74) Attorney, Agent, or Firm—Gregory O. Garmong; Carmen Santa Maria; McNees Wallace & Nurick LLC

(57) ABSTRACT

A nickel-base superalloy article has a surface protective layer comprising nickel, from about 20 to about 35 weight percent aluminum, and from about 0.5 to about 10 weight percent rhenium. The protective layer, which is preferably an overlay coating of the beta (β) phase NiAl form, is formed by depositing nickel, aluminum, rhenium, and modifying elements onto the substrate surface. A ceramic layer may be deposited overlying the protective layer.

19 Claims, 2 Drawing Sheets

_US 6,632,480 B2_

NICKEL-BASE SUPERALLOY ARTICLE WITH RHENIUM-CONTAINING PROTECTIVE LAYER, AND ITS PREPARATION

This application is a division of application Ser. No. 09/562,999, filed Apr. 24, 2000 now U.S. Pat. No. 6,461,746, for which priority is claimed and whose disclosure is incorporated by reference.

This invention relates to an article made of a nickel-base superalloy, and, more particularly, to the protection of the surface of such an article.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor. The hot exhaust gases flow from the back of the engine, driving it and the aircraft forwardly.

The hotter the combustion and exhaust gases, the more efficient is the operation of the jet engine. There is thus an incentive to raise the combustion and exhaust gas temperatures. The maximum temperature of the combustion gases is normally limited by the materials used to fabricate the turbine vanes and turbine blades of the gas turbine, upon which the hot combustion gases impinge. In current engines, the turbine vanes and blades are made of nickel-based superalloys, and can operate at temperatures of up to about 1800–2100° F.

Many approaches have been used to increase the operating temperature limit and service lives of the turbine blades and vanes to their current levels. For example, the composition and processing of the base materials themselves have been improved. Cooling techniques are used, as for example providing the component with internal cooling passages through which cooling air is flowed.

In another approach, the surfaces of the turbine blades and vanes are coated with aluminum-containing protective coatings that protect the articles against the combustion gas, and in some cases insulate the articles from the temperature of the combustion gas. An example is overlay coatings applied to some or all of the surfaces of the article to be protected. A ceramic layer may overlie the protective layer. The articles are thereby able to run cooler and are more resistant to environmental attack.

Although all of these approaches are effective in improving the performance of gas turbines, there is an opportunity for additional improvements to extend the operating temperatures and service lives of the gas turbine components. There is a need for improved protective coating systems that extend the capabilities of the turbine components even further. The present invention fulfills this need, and further provides related advantages.

BRIEF SUMMARY OF THE INVENTION

The present invention provides a nickel-base superalloy article protected by a protective layer, and a method for its preparation. The article is particularly useful as a gas turbine blade or gas turbine vane. The article has a prolonged life in the thermal cycling conditions found in aircraft engine operation, as compared with conventional articles.

A nickel-base superalloy article protected by a protective layer comprises an article substrate having a surface and comprising a nickel-base superalloy, and a protective layer on the surface of the article substrate. The protective layer comprises nickel, from about 20 to about 35 weight percent aluminum, and from about 0.5 to about 10 weight percent rhenium. The protective layer is preferably of a predominantly beta (β) phase NiAl type, and is preferably from about 0.0005 inch to about 0.004 inch thick. The protective layer more preferably comprises from about 0.5 to about 7 weight percent rhenium, and most preferably comprises from about 0.5 to about 3 weight percent rhenium. Elements initially present in the substrate may and usually do interdiffuse into the protective layer. The protective layer may also include modifying elements such as zirconium, hafnium, chromium, yttrium, and/or silicon to further improve its properties. A ceramic layer may overlie the protective layer.

The addition of rhenium to the protective layer improves the stability of the protective layer because it reduces the diffusional rates in the nickel-base superalloy substrate and in the protective layer. The stability is also increased because rhenium has limited solubility in the gamma prime phase of the substrate and therefore the beta phase NiAl is retained for a longer period of time. The service life of the protective layer is thereby increased. The rhenium also strengthens the protective layer, improving its resistance to creep and other failure mechanisms.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
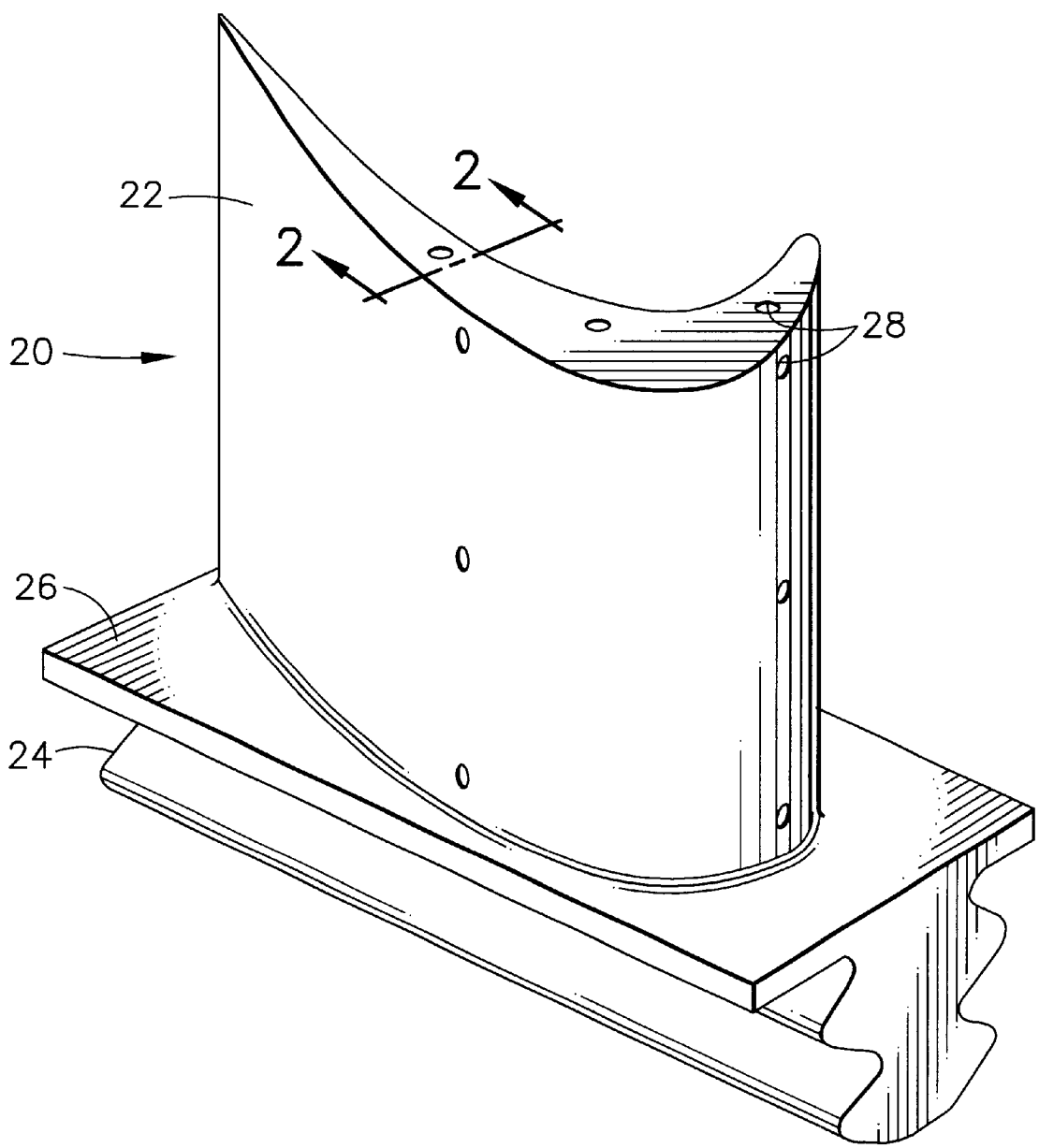
FIG. 1 is a perspective view of a turbine blade.

FIG. 1 depicts a gas turbine engine component such as a turbine blade or turbine vane, and in this illustration a turbine blade 20. The turbine blade 20 is formed of a nickel-base superalloy. The turbine blade 20 includes an airfoil 22 against which the flow of hot exhaust gas is directed. (The turbine vane has a similar appearance in respect to the pertinent portions.) The turbine blade 20 is mounted to a turbine disk (not shown) by a dovetail 24 which extends downwardly from the airfoil 22 and engages a slot on the turbine disk. A platform 26 extends laterally outwardly from the area where the airfoil 22 is joined to the dovetail 24. A number of internal passages extend through the interior of the airfoil 22, ending in openings 28 in the surface of the airfoil 22. A flow of cooling air is directed through the internal passages, to reduce the temperature of the airfoil 22.

Figure 2:
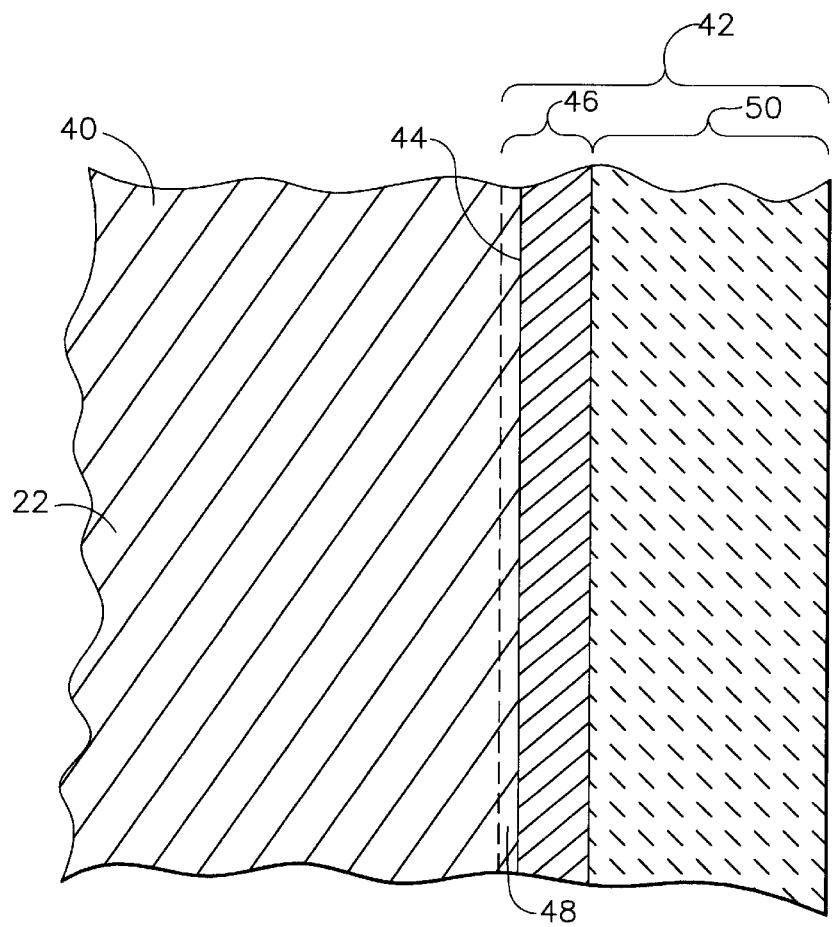
FIG. 2 is an enlarged schematic sectional view through the turbine blade of FIG. 1, taken on line 2—2.

FIG. 2 is a sectional view through the turbine blade of FIG. 1. The airfoil 22 of the turbine blade 20 serves as a substrate 40 for a protective system 42 that overlies a surface 44 of the substrate. The protective system 42 includes a protective layer 46 that overlies and contacts the surface 44. The protective layer 46 may interdiffuse slightly with the substrate 40, producing an interdiffusion zone 48 that is part of the protective layer 46. With increasing exposure at elevated temperature, the interdiffusion zone 48 enlarges and thickens. The presence of rhenium aids in controlling such enlargement of the interdiffusion zone 48, thereby contributing to the stability of the protective layer 46.

The protective layer 46 is first deposited as a layer of nickel, aluminum, rhenium, and other modifying elements that are optionally but desirably included in the protective layer 46. The protective layer 46 is preferably an overlay coating, most preferably a predominantly beta (β) phase NiAl overlay coating. The stoichiometric composition of the beta NiAl phase is about 50 atomic percent (about 31.4 weight percent) aluminum, with the balance nickel. The beta phase has a relatively wide composition range, from a hypostoichiometric composition of about 35 atomic percent (20 weight percent) aluminum to a hyperstoichiometric composition of about 55 atomic percent (35 weight percent) aluminum. Thus, the allowable composition range is from about 20 to about 35 weight percent aluminum. Narrower ranges are preferred in specific applications, however, to avoid the formation of excessive amounts of other phases. Specifically, the range of from about 22 to about 30 weight percent aluminum is preferred, and the range of from about 22 to about 27 weight percent aluminum is most preferred. As used herein, "predominantly" means that the overlay coating exceeds about 80 percent by volume of the β-phase NiAl. The protective layer 46, when a predominantly beta (β) phase NiAl overlay coating, may optionally include modifying elements such as zirconium, chromium, hafnium, yttrium, or silicon. The protective layer 46 is preferably from about 0.0005 to about 0.004 inch thick, most preferably about 0.002 inch thick. Thinner layers are less protective, and thicker layers may be subject to spallation during thermal cycling. The upper surface of the protective layer 46 oxidizes to form an aluminum oxide protective scale after exposure at elevated temperature.

The rhenium content of the protective layer is from about 0.5 to about 10 percent by weight. Preferably, the rhenium content of the protective layer is from about 0.5 to about 7 percent by weight. More preferably, the rhenium content of the protective layer is from about 0.5 to about 3.0 percent by weight. If the rhenium content is less than that indicated, the protective layer is operable but does not achieve the benefits of the invention. If the rhenium content is greater than that indicated, the rhenium may contribute to phase instability of the protective layer by formation of topologically close packed (TCP) phases.

The presence of rhenium provides important benefits to the protective layer. It slows the diffusional rates between the substrate and the protective layer, so that the interdiffusion zone 48 does not grow thicker than desired. Rhenium has limited solubility in the gamma phase of the nickel-base superalloy that forms the substrate, and instead preferentially partitions to the NiAl-base beta phase of the protective layer 46. Diffusional and phase instability of the protective layer are thereby retarded as compared with a comparable alloy that contains no rhenium. Improved stability against interdiffusional instabilities and phase instabilities is important, both for improved operating life at elevated temperature and for an ability to function after multiple airfoil repair/refurbishment cycles. The rhenium also strengthens the protective layer 46 against failure due to creep and other mechanisms.

Optionally, a ceramic layer 50 overlies and contacts the protective layer 46. The protective layer 46 and, where present, the ceramic layer 50 together constitute the protective system 42. The ceramic layer 50 is preferably yttria-stabilized zirconia, which is zirconium oxide containing from about 2 to about 12 weight percent, preferably from about 3 to about 8 weight percent, of yttrium oxide. The ceramic layer 50 is typically from about 0.003 to about 0.010 inch thick. Other operable ceramic materials may be used as well. When there is no ceramic layer 50 present, the protective layer 46 is termed an "environmental coating". When there is a ceramic layer 50 present, the protective layer 46 is termed a "bond coat".

Figure 3:
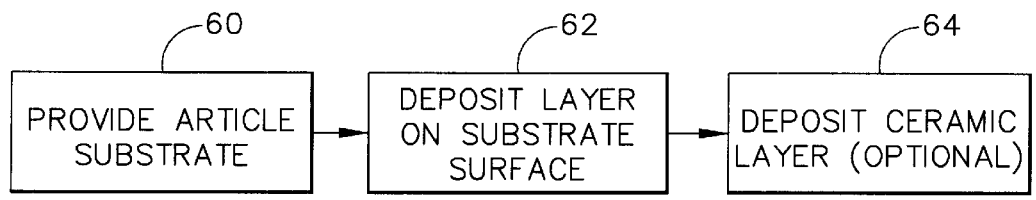
FIG. 3 is a block flow diagram of an approach for preparing a coated gas turbine airfoil.

FIG. 3 is a block diagram of an approach for practicing the present invention. An article substrate is provided, numeral 60. The article substrate is preferably the airfoil 22 of FIG. 1, either as a turbine blade or turbine vane. The airfoil (and typically all of the turbine blade or turbine vane) may be made of any operable base-metal alloy material, with a nickel-base superalloy being preferred. As used herein, "nickel-base" means that the composition has more nickel present than any other element. The nickel-base superalloys are typically of a composition that is strengthened by the precipitation of gamma-prime phase. The preferred nickel-base alloy has a composition, in weight percent, of from about 4 to about 20 percent cobalt, from about 1 to about 10 percent chromium, from about 5 to about 7 percent aluminum, from 0 to about 2 percent molybdenum, from about 3 to about 8 percent tungsten, from about 4 to about 12 percent tantalum, from 0 to about 2 percent titanium, from 0 to about 8 percent rhenium, from 0 to about 6 percent ruthenium, from 0 to about 1 percent niobium, from 0 to about 0.1 percent carbon, from 0 to about 0.01 percent boron, from 0 to about 0.1 percent yttrium, from 0 to about 1.5 percent hafnium, balance nickel and incidental impurities.

A most preferred alloy composition is Rene' N5, which has a nominal composition in weight percent of about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, about 0.15 percent hafnium, up to about 0.01 percent yttrium, balance nickel and incidental impurities. Other operable superalloys include, for example, Rene' N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities; Rene 142, which has a nominal composition, in weight percent, of about 12 percent cobalt, about 6.8 percent chromium, about 1.5 percent molybdenum, about 4.9 percent tungsten, about 6.4 percent tantalum, about 6.2 percent aluminum, about 2.8 percent iron, about 1.5 percent hafnium, about 0.1 percent carbon, about 0.015 percent boron, balance nickel and incidental impurities; CMSX-4, which has a nominal composition in weight percent of about 9.60 percent cobalt, about 6.6 percent chromium, about 0.60 percent molybdenum, about 6.4 percent tungsten, about 3.0 percent rhenium, about 6.5 percent tantalum, about 5.6 percent aluminum, about 1.0 percent titanium, about 0.10 percent hafnium, balance nickel and incidental impurities; CMSX-10, which has a nominal composition in weight percent of about 7.00 percent cobalt, about 2.65 percent chromium, about 0.60 percent molybdenum, about 6.40 percent tungsten, about 5.50 percent rhenium, about 7.5 percent tantalum, about 5.80 percent aluminum, about 0.80 percent titanium, about 0.06 percent hafnium, about 0.4 percent niobium, balance nickel and incidental impurities; PWA1480, which has a nominal composition in weight percent of about 5.00 percent cobalt, about 10.0 percent chromium, about 4.00 percent tungsten, about 12.0 percent tantalum, about 5.00 percent aluminum, about 1.5 percent titanium, balance nickel and incidental impurities; PWA1484, which has a nominal composition in weight percent of about 10.00 percent cobalt, about 5.00 percent chromium, about 2.00 percent molybdenum, about 6.00 percent tungsten, about 3.00 percent rhenium, about 8.70 percent tantalum, about 5.60 percent aluminum, about 0.10 percent hafnium, balance nickel and incidental impurities; and MX-4, which has a nominal composition as set forth in U.S. Pat. No. 5,482,789, in weight percent, of from about 0.4 to about 6.5 percent ruthenium, from about 4.5 to about 5.75 percent rhenium, from about 5.8 to about 10.7 percent tantalum, from about 4.25 to about 17.0 percent cobalt, from 0 to about 0.05 percent hafnium, from 0 to about 0.06 percent carbon, from 0 to about 0.01 percent boron, from 0 to about 0.02 percent yttrium, from about 0.9 to about 2.0 percent molybdenum, from about 1.25 to about 6.0 percent chromium, from 0 to about 1.0 percent niobium, from about 5.0 to about 6.6 percent aluminum, from 0 to about 1.0 percent titanium, from about 3.0 to about 7.5 percent tungsten, and wherein the sum of molybdenum plus chromium plus niobium is from about 2.15 to about 9.0 percent, and wherein the sum of aluminum plus titanium plus tungsten is from about 8.0 to about 15.1 percent, balance nickel and incidental impurities. The use of the present invention is not limited to these preferred alloys, and has broader applicability.

The deposited layer is deposited onto the surface 44 of the substrate 40, numeral 62. The protective layer 46 is deposited overlying and contacting the surface 44, numeral 62. The protective layer 46, which is preferably predominantly beta ($\beta$) phase NiAl overlay coating, is preferably deposited by any operable deposition technique, such as electron beam physical vapor deposition (EBPVD), sputtering, cathodic arc, ion-plasma deposition, low pressure plasma spray, and air plasma spray. The predominantly beta ($\beta$) phase NiAl protective layer 46 is preferably from about 0.0005 to about 0.004 inch, most preferably about 0.002 inch, thick. In the most preferred EBPVD process, which is known for other applications and for other materials, the aluminum and other elements that may be deposited such as nickel, zirconium, and chromium are typically deposited from one molten pool, whereas the rhenium is deposited from a separate pool because of its low vapor pressure. The rhenium pool must be electron-beam heated to a much higher temperature than the other pool or pools. In sputtering, the rhenium is incorporated into the target, which also contains the other elements desired in the final coating, in the desired amounts. For the spray processes, the rhenium is incorporated into the sprayed powder in the desired amount.

The protective layer 46 may instead be another type of overlay coating modified according to the invention, such as an MCrAlX coating, or a diffusion aluminide coating, such as a diffusion nickel aluminide or platinum-modified diffusion aluminide, but these alternatives are not preferred.

The substrate 40 is typically heated during the deposition process. There is consequently an interdiffusion of the deposited layer and the underlying substrate material. It is preferred that there be an interdiffusion equivalent to exposure to a temperature of from about 1800° F. to about 2100° F. for a period of 4–8 hours so that deposited nickel, aluminum, rhenium, and any other modifying elements interdiffuse into the substrate 40, and atoms from the substrate interdiffuse into the deposited layer. Optionally, the heating may be continued after the deposition is completed, to achieve further interdiffusion.

The protective coating 42 optionally includes the ceramic layer 50, deposited overlying and contacting the protective layer 46. The ceramic layer 50 is preferably from about 0.003 to about 0.010 inch thick, most preferably about 0.005 inch thick. (FIG. 2 is not drawn to scale.) The ceramic layer 50 is preferably yttria-stabilized zirconia, which is zirconium oxide containing from about 2 to about 12 weight percent, preferably from about 3 to about 8 weight percent, of yttrium oxide. Other operable ceramic materials may be used as well. It may be deposited, numeral 64, by any operable technique, such as physical vapor deposition or plasma spray.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for preparing an article, comprising the steps of providing a substrate having a surface and comprising a nickel-base superalloy; and depositing a protective layer onto the surface of the substrate, the protective layer comprising nickel, from about 20 to about 35 weight percent aluminum, and from about 0.5 to about 10 weight percent rhenium.

2. The method of claim 1, wherein the step of depositing includes the step of depositing the layer using a method selected from the group consisting of electron beam physical vapor deposition, sputtering, cathodic arc, ion-plasma deposition, low pressure plasma spray, and air plasma spray.

3. The method of claim 1, including an additional step, after the step of depositing the protective layer, of depositing a ceramic layer overlying the protective layer.

4. A method for preparing an article, comprising the steps of providing a substrate having a surface and comprising a nickel-base superalloy; and depositing a protective layer onto the surface of the substrate, the protective layer comprising nickel, from about 20 to about 35 weight percent aluminum, and from about 0.5 to about 10 weight percent rhenium, wherein the protective layer comprises a predominantly beta ($\beta$) phase NiAl composition.

5. The method of claim 4, wherein the step of depositing includes the step of depositing the layer using a method selected from the group consisting of electron beam physical vapor deposition, sputtering, cathodic arc, ion-plasma deposition, low pressure plasma spray, and air plasma spray.

6. The method of claim 4, including an additional step, after the step of depositing the protective layer, of depositing a ceramic layer overlying the protective layer.

7. The method of claim 4, wherein the step of depositing the protective layer includes the step of depositing the protective layer comprising from about 0.5 to about 7 weight percent rhenium.

8. The method of claim 4, wherein the step of depositing the protective layer includes the step of depositing the protective layer comprising from about 0.5 to about 3 weight percent rhenium.

9. The method of claim 4, wherein the step of depositing the protective layer includes the step of depositing the protective layer comprising at least one element selected from the group consisting of zirconium, hafnium, chromium, yttrium, and silicon.

10. The method of claim 4, wherein the step of depositing the protective layer includes the step of depositing the protective layer comprising from about 0.0005 inch to about 0.004 inch thick.

11. The method of claim 4, wherein the step of providing the substrate includes the step of providing the substrate having a shape of a gas turbine component.

12. A method for preparing an article, comprising the steps of providing a substrate having a surface, wherein the substrate has a composition, in weight percent, of from about 4 to about 20 percent cobalt, from about 1 to about 10 percent chromium, from about 5 to about 7 percent aluminum, from 0 to about 2 percent molybdenum, from about 3 to about 8 percent tungsten, from about 4 to about 12 percent tantalum, from 0 to about 2 percent titanium, from 0 to about 8 percent rhenium from 0 to about 6 percent ruthenium, from 0 to about 1 percent niobium, from 0 to about 0.1 percent carbon, from 0 to about 0.01 percent boron, from 0 to about 0.1 percent yttrium, from 0 to about 1.5 percent hafnium, balance nickel and incidental impurities; and depositing a protective layer onto the surface of the substrate, the protective layer comprising nickel, from about 20 to about 35 weight percent aluminum, and from about 0.5 to about 10 weight percent rhenium.

13. The method of claim 12, wherein the step of depositing includes the step of depositing the layer using a method selected from the group consisting of electron beam physical vapor deposition, sputtering, cathodic arc, ion-plasma deposition, low pressure plasma spray, and air plasma spray.

14. The method of claim 12, including an additional step, after the step of depositing the protective layer, of depositing a ceramic layer overlying the protective layer.

15. The method of claim 12, wherein the step of depositing the protective layer includes the step of depositing the protective layer comprising from about 0.5 to about 7 weight percent rhenium.

16. The method of claim 12, wherein the step of depositing the protective layer includes the step of depositing the protective layer comprising a predominantly beta ($\beta$) phase NiAl composition.

17. The method of claim 12, wherein the step of depositing the protective layer includes the step of depositing the protective layer comprising at least one element selected from the group consisting of zirconium, hafnium, chromium, yttrium, and silicon.

18. The method of claim 12, wherein the step of depositing the protective layer includes the step of depositing the protective layer comprising from about 0.0005 inch to about 0.004 inch thick.

19. The method of claim 12, wherein the step of providing the substrate includes the step of providing the substrate having a shape of a gas turbine component.

* * * * *